United States Patent Office 3,374,091
Patented Mar. 19, 1968

3,374,091
TREATMENT OF COPPER LEACH SOLUTIONS
Henry J. Tschirner and Lester A. Williams, Kansas City, Mo., assignors to Monsanto Company, St. Louis, Mo., a corporation of Delaware
No Drawing. Filed May 28, 1965, Ser. No. 459,925
9 Claims. (Cl. 75—120)

This invention relates to a method of separating impurities, such as lead and tin, from a solution which also contains dissolved values of at least one other nonferrous metal which is to be recovered from the solution substantially free from said impurities. This invention is mainly directed to an improvement in a hydrometallurgical process in which a solution containing tin and lead impurities and a metal selected from the group consisting of copper, nickel and cobalt is first purified by substantial removal of such impurities, and the other metal is then precipitated from a solution in which it is present as a dissolved salt by reacting the solution with a reducing gas at elevated temperature and under superatmospheric pressure. More particularly, the invention relates to the removal of lead and tin impurities from a copper-containing ammoniacal ammonium carbonate solution prior to hydrogen reduction of said solution to recover copper particles therefrom.

The prior art has recognized the problem of removing lead and/or tin from a copper-ammonia-carbon dioxide leach solution by various procedures which are referred to below.

In U.S. Patent 2,923,618, there is disclosed a method of removing lead and tin from a leach solution, such as described above, by adding a soluble sulfate to the leach liquor in quantities several times as large as the lead content of the solution followed by the addition of a solution of a water-soluble salt of hydroxide of strontium, barium, or calcium. It is pointed out in this patent that the soluble sulfate must be added prior to the addition of the soluble precipitating compound, i.e., a solution of a water-soluble salt or hydroxide of strontium, barium or calcium. The patent indicates that reversing the order of addition of the soluble sulfate first and followed by the addition of the soluble precipitating compound greatly impairs the efficiency of the lead and tin removal.

In U.S. Patent 2,927,018, there is disclosed a process for the removal of lead and tin from a copper-ammonia-carbon dioxide leach solution by the addition of a soluble oxalate, or both soluble oxalate and the sulfate, to the said leach solution in quantities several times as large as the lead content of the solution, followed by the addition of a solution of a water-soluble salt or hydroxide of strontium, barium or calcium. The patent teaches that the soluble oxalate (or oxalate and sulfate) must be added prior to the addition of the soluble precipitating compound, i.e., a soluble salt of hydroxide of strontium, barium or calcium. Furthermore, it is stated that reversing the order of addition greatly impairs the efficiency of lead and tin removal. In column 4 of this patent, it is disclosed that the utilization of strontium, barium, or calcium either as a salt or in the hydroxide form was ineffective alone, and it was not until the oxalate was added to the leach solution prior to the addition of the soluble alkaline earth compound that it was found that the character of the precipitate therein changed and at the same time lead was removed from the solution.

U.S. Patent 2,970,051 teaches a process for removing lead as an impurity from a copper-ammonia-carbon dioxide leach solution by the addition of a metal hydroxide selected from the group consisting of titanium, vanadium, chromium, manganese, and iron. The patent also points out that these particular metals, in the hydroxide form, form a floc in the solution and that the lead present in the solution is absorbed by the metal hydroxide floc and precipitated therefrom. The patent further indicates that the only apparent limitations on the hydroxides which can be employed in this process are that they must be insoluble in the solution subjected to treatment. Otherwise no flocs are formed for the absorption of the lead values. It is noted that the patentee fails to disclose in any part of the specification the removal of tin from the solution.

On the other hand, U.S. Patent 3,127,264 discloses a method for the removal of lead and tin from a leach solution which contains also dissolved values of at least one other nonferrous metal which is to be recovered from the solution substantially free from impurities. The essence of the patent teaching is the use of Celestite or strontimum sulfate in the removal of the lead and tin prior to the product metal precipitation by a reduction step. In Example I of the aforementioned patent, strontium carbonate is reacted with sulfuric acid and the precipitated strontium sulfate is separated from the solution and washed free of the acid. The freshly precipitated strontium sulfate is then added to the copper-bearing solution which is at room temperature and the over-all solution containing the strontium sulfate is agitated for one hour. The explanation given for the function of Celestite in the copper-bearing solution is that lead and tin contained in the leach solution enter into the crystal structure of the Celestite and subsequently the Celestite and lead and tin, combined as such, precipitate therefrom.

Another process for the removal of impurities such as lead, tin, iron, and chromium and traces of other metals, which constitute contaminants in a copper-bearing solution, has been the washing of the copper with an aqueous acetic acid solution after said copper metal has been separated from the leach solution. This latter method has been considered to be unsuccessful and is relatively ineffective in the removal of lead and tin from the copper either in the solution as such or as a powder or particle.

As can readily be seen from the aforementioned patents, a variety of processes have been proposed for the removal of lead per se, or a combination of lead and tin, from copper-bearing leach solutions. The aforementioned patented processes have the inherent disadvantage of removing either only lead or tin, or some lead and some tin, but generally are not satisfactory for the substantially complete and simultaneous removal of both lead and tin.

In conjunction with the prior art disadvantages, and more specifically, one of the particular problems associated with the recovery of substantially pure copper metal from copper-bearing scrap material such as automobile radiators, is that profitability is marginal and any improved method which effects a substantial savings or a reduction in manufacturing costs is an important economic incentive.

There is, therefore, a definite need for an economic method for simultaneously separating impurities, particularly lead and tin, from a solution which is to be treated for the recovery of a product metal of the group copper, nickel and cobalt, substantially free from such metal impurities.

The improved method of this invention has the important advantage of efficiently removing both lead and tin from leach solutions without appreciable co-precipitation of the metal of interest. Ths method is effective, rapid, and relatively inexpensive.

The present invention then has for its general object to accomplish the simultaneous and substantially complete removal of both lead and tin from an ammonium salt leach liquor containing nickel, copper, or cobalt salts prior to the reduction of such salts to the metal state by hydrogen or other reducing gases. However, the process of this invention has further advantages not apparent solely in the purity of the product. For example, the removal of these impurities at an early stage in the process of precipitating the desired metal constituents considerably diminishes the fouling of surfaces in heat exchangers normally used in such process. Moreover, since there is no longer need for the acetic acid wash, certain items of equipment may be eliminated or replaced by less expensive equipment at a different point in the process. Furthermore the number of process steps, i.e. the number of additions of raw materials to remove the lead and tin from the copper-bearing solutions, is substantially reduced.

Accordingly it is one object of the present invention to provide an improved method or process for removing both lead and tin from solutions containing other dissolved nonferrous metal values.

Another object of the present invention is to provide an improved method for the removal of both lead and tin from cobalt, nickel, or copper-bearing leach solutions, particularly from commercial leach solutions containing the aforementioned metals.

Still further objects and advantages of the present invention will be apparent from the following description and the appended claims.

The present invention, in general, provides a novel process for treating a solution containing dissolved nonferrous metal values to simultaneously remove lead and tin impurities therefrom, which comprises the steps of contacting said solution with a mixture of calcium hydroxide and magnesium hydroxide, and removing the solid material formed in said solution therefrom, thereby also removing substantially all, or a substantial amount, of said impurities.

The aforementioned solution, which is to be treated by the novel process of the present invention, is preferably an ammoniacal ammonium carbonate leach liquor which has, for example, been used to extract the copper, nickel, and/or cobalt from a raw material, such as scrap material or ore concentrates containing one or more of such metals together with tin and lead. Consequently the preferred leach liquor thus contains dissolved therein, copper, nickel, and/or cobalt, ammonia, lead, tin, carbon dioxide, and which may or may not contain traces of other nonferrous and/or ferrous metals. Another preferred leach solution for use in the process of this invention is an ammoniacal ammonium sulfate leach liquor which contains, dissolved therein, nickel and/or cobalt, ammonia, lead, tin, sulfate ions, and which may or may not contain traces of other nonferrous and/or ferrous metals.

A typical copper-ammoniacal ammonium carbonate solution, which is set forth herein for exemplary purposes only and is not to be considered limitive of the type solutions treated with the novel process of the present invention, contains (a) 110 to 180 grams total ammonia per liter of solution, (b) 70 to 130 grams carbon dioxide per liter, (c) 120 to 180 grams of dissolved copper metal per liter, and, as impurities, (d) 0.1 to 2 grams lead per liter and 0.1 to 1.5 grams tin per liter of solution. These ammonium salt solutions or alkaline solutions generally have a pH value between 7 and 12. It has been found that when the pH of the solution is outside the above pH limits, the effectiveness of the hydroxide mixture for the removal of both lead and tin is somewhat impaired. Typical nickel and cobalt solutions are also within the aforementioned ranges and pH limits; however, these solutions may be in the form of the ammonium sulfate solution instead of the carbonate solution.

The mixture of calcium hydroxide and magnesium hydroxide which is employed in the improved method of this invention, is readily available. Specifically, this mixture can be obtaned commercially in form of a finely divided dead burnt dolomitic limestone which has been produced by the calcination at elevated temperatures of dolomite spar, a double salt of calcium and magnesium carbonates corresponding to the formula $CaCO_3 \cdot MgCO_3$. The calcination effects a conversion of the metal carbonates to metal hydroxides. It is to be noted that the dolomitic limestone is approximately one-third the cost of the Celestite which is utilized in U.S. Patent 3,127,264. While the dolomite spar occurs in nature in various rocks and can be converted with little difficulty to dead burnt dolomitic limestone, the magnesium and calcium hydroxides can be produced synthetically by known chemical processes and utilized as such.

In a preferred embodiment, it is desirable to use a hydroxide mixture containing from about 40% to about 70% by weight, based on the total weight of such mixture, of calcium hydroxide, and from about 60% to about 30% by weight, based on the total weight of said mixture, of magnesium hydroxide. The said limestone generally falls within the above limits.

The dolomitic limestone is preferably added to the "pregnant," i.e. metal-containing, leach solution in a finely divided form, i.e. preferably of a particle size within the range of from about 40 to about 150 microns and having a bulk density of about 50 lbs./ft.$^3$. However, most particle sizes are considered within the scope of the present invention. However, if the particles are too fine (e.g. particles passing through a No. 325 U.S. Standard screen mesh), the resultant particles in the treated solution may possibly plug a filter if such a device is used to subsequently remove the solids resulting from the treatment; whereas too coarse a material (e.g. particles retained on a No. 10 US. Standard screen mesh) may reduce the degree of effectiveness of the subsequent chemical reaction which takes place in the leach solution.

In a preferred embodiment of the present invention, it is preferred to conduct the purification step at ambient temperature or slightly above, e.g. from about 20° C. to about 50° C., and to add the mixture of calcium hydroxide and magnesium hydroxide, in the form of a finely divided dead burnt dolomitic limestone, to the ammonia salt solution containing nonferrous metal values on an intermittent basis and in fractions or fractional amounts (of the total required) over a period of from 5 minutes to 5 hours or longer, preferably from 5 to about 60 minutes, and more preferably from about 15 to about 30 minutes. Preferably, the fractions added are uniform in quantity or substantially so. While the mixture of hydroxides is preferably added intermittently, it is within the scope of the present invention to "slug," i.e. add all the or total mixture at once to the solution, or continuously feed the mixture to said solution over a period of time. It has been determined, however, that when the mixture is "slugged" or continuously fed to said solution, there is not an as effective contact with the lead and tin impurities therein, as compared to the intermittent addition of said mixture to the said solution. Therefore, such procedures do not remove the lead and tin impurities as efficiently as the intermittent addition method.

The total amount of the hydroxide mixture added to said solution is predetermined and is contingent upon the total concentration by weight of both the lead and tin in the initial solution prior to the purification treatment. As previously mentioned, the typical level of lead and tin in the solution ranges from about .1 to about 2 grams of lead per liter of said solution and from about .1 to about 1.5 grams of tin per liter of solution. It has been determined that the most effective removal of both the lead and tin from said solution is brought about by adding the mixture of calcium hydroxide and magnesium hydroxide in such an amount as to yield a final weight ratio in the solution, after all the additions of said mixture have been made, of the hydroxides to the total concentration of lead and tin in said solution within the range of from about 5:1 to about 10:1.

As mentioned heretofore, the mixture of hydroxides is preferably contacted periodically with said solution and in uniform fractions or fractional amounts over a period of from 15 to 30 minutes. It was also determined that the intermittent contacting of said material with said solution (or adding the fractional amount of mixture thereto) be conducted at from about 1-minute intervals to about 5-minute intervals and more preferably from about 2-minute intervals to about 4-minute intervals. (However longer intervals, e.g. 10, 15, 20, etc. minute intervals, is within the scope of the present invention especially if the total addition time is 5 hours or longer.) Stated differently and for exemplary purposes only, a rate of addition to one liter of solution on an intermittent basis can be 0.67 gram every 2 minutes, 1.0 gram every 3 minutes or 1.33 grams every 4 minutes, based upon an over-all contact time of 15 minutes during which intermittent additions are made to said solution, and a solution having a total lead and tin concentration of 1 gram.

During the addition of the hydroxide mixture to the solution, approximately 1 to 3 grams of diatomaceous earth per liter of solution may be added thereto in order to subsequently serve as a filter aid. It was found in the operation of the solution purification step that the addition to such solution of a filter aid facilitates and expedites the subsequent liquid-solids separation step. It will be understood, however, that the addition of diatomaceous earth does not, in so far as is known, take part in the precipitating action during which lead and tin impurities are precipitated; it appears to act merely as a filter aid and other known filter aids can be employed herein. The process, however, is also operable without the use of a filter aid.

During the addition of the mixture of hydroxides to the solution, said solution is continuously agitated in order to achieve effective contact between said mixture and the impurities. After the final addition of said mixture, the solution is thereafter also continuously agitated for periods up to 5 hours and longer in order to further insure an effective contact of said mixture with said impurities. Preferably, the agitation after final addition is conducted for a period within the range of 1 to about 60 minutes, and more preferably from about 15 to 30 minutes. The precipitated impurities and the filter aid, both of which constitute solid particles in said solution, are removed or separated from the solution by passing said solution containing the solid material therein through a filter. As previously mentioned, the process is operable without the utilization of a filter aid; if the filter aid is omitted, the separation of the precipitated impurities from the solution may also be carried out by filtration or by other liquid-solid processing steps such as by centrifuging or decanting. The purified solution is thereafter treated by known processes to recover the desired dissolved metal value such as copper, cobalt and/or nickel therefrom.

The following examples illustrate the process of this invention in the precipitation of lead and tin from an ammoniacal ammonium salt solution which contains dissolved lead and tin, and the results obtained, it being understood that these examples are merely exemplary of the invention and are not considered limiting. Also, in the following examples although reference is made to the metal per se, it will be understood that the metals are actually present in the solutions as ions or compounds, and the percentages thereof are calculated on the basis of the actual metal content.

Example I

A solution having dissolved therein 111 grams per liter copper and containing as impurities 0.65 gram per liter lead, .40 gram per liter tin, together with 105 grams per liter total ammonia, and 70 grams per liter carbon dioxide as essential ingredients was treated with finely divided dead burnt dolomitic limestone which had an average particle size of 44 microns and analyzed 46% $Ca(OH)_2$ and 33% $Mg(OH)_2$ (remainder inert material and water. Approximately 10 grams of such limestone were intermittently added in uniform fractions and at 2-minute intervals, i.e. 1 gram every 2 minutes, to one liter of the aforementioned solution over a period of 20 minutes while continuously agitating said solution which was at a temperature of 30° C. After 15 minutes had elapsed from the initial addition of such limestone to said solution, approximately 2 grams of diatomaceous earth was also added to said solution. The resulting solution was agitated for an additional 15 minutes after the final amount of limestone was added thereto and then filtered. The purified solution was analyzed and was found to contain 0.08 gram per liter lead and 0.01 gram per liter tin. This purification step thus resulted in a 92% removal of the lead material and 99% removal of the tin material.

The foregoing procedure of Example I was repeated without the use of a filter aid and the solution containing the precipitated impurities was separated therefrom by means of decantation; substantially the same degree of removal of lead and tin impurities were obtained as in the filtration procedure set forth above.

Example II

A solution which contained 125 grams per liter of dissolved copper, 0.41 gram per liter lead, 0.47 gram per liter tin, 114 grams per liter total ammonia, and 81 grams per liter carbon dioxide was treated with a mixture of calcium hydroxide and magnesium hydroxide which was prepared from commercially available laboratory materials and had an average particle size of 50 microns. The mixture consisted of 59% $Ca(OH)_2$ and 41% $Mg(OH)_2$. Eight grams of such mixture were intermittently added in uniform fractions and at 4-minute intervals, i.e., 2 grams every 4 minutes, to one liter of said solution over a period of 16 minutes while continuously agitating said solution which was at a temperature of 43° C. After 10 minutes had elapsed from the initial addition of said mixture to said solution, 1.5 grams of diatomaceous earth was also added to said solution. The solution was agitated for an additional 15 minutes after the final amount of the mixture was added thereto, and was then filtered. The purified solution was then analyzed and was found to contain 0.060 gram per liter lead and 0.005 gram per liter tin. There was consequently a 93% removal of the lead material and, as found in Example I, a 99% removal of tin.

In order to demonstrate the decreased efficiency in removing lead and tin from a solution which has been treated with only one of the metal hydroxides, the procedure of Example II was repeated except that 100% $Ca(OH)_2$, commercial grade, was used rather than a mixture of $Ca(OH)_2$ and $Mg(OH)_2$. This purification process, utilizing calcium hydroxide per se, resulted in only a 64.4% removal of lead and less than 1% removal of tin.

Example III

A solution containing 117 grams of dissolved nickel, 0.79 gram per liter lead, 0.38 gram per liter tin, 107 grams per liter total ammonia, and 88 grams per liter of $SO_4$ was treated with finely divided dead burnt dolomitic limestone which had an average particle size of 44 microns and analyzed 46% $Ca(OH)_2$ and 33% $Mg(OH)_2$, the remainder being inert material and water. Approximately a total of 20 grams of such limestone was intermittently added in uniform fractions thereof and at 3-minute intervals, i.e. 2.0 grams every 3 minutes, to one liter of the aforementioned solution over a period of 30 minutes while continuously agitating said solution which was at a temperature of 22° C. After 25 minutes had elapsed from the initial addition of such limestone to said solution, approximately 3 grams of diatomaceous earth was also added to said solution. The solution was agitated for an additional 30 minutes after the final amount of limestone was added thereto, and then was filtered. The purified solution was analyzed and was found to contain 0.02 gram per liter lead; no trace of tin could be noted. This purification step of the nickel-containing solution thus resulted in a 95.5% removal of lead and a substantially complete (100%) removal of tin.

*Example IV*

A solution which contained 121 grams of dissolved cobalt, 0.89 gram per liter lead, 0.55 gram per liter tin, 113 gram per liter total ammonia, and 73 grams per liter $SO_4$ was treated with a mixture of calcium hydroxide (59%) and magnesium hydroxide (41%) which was prepared from commercially available laboratory materials and had an average particle size of 50 microns. A total of ten (10) grams of such mixture were intermittently added in uniform fractions and at three (3) minute intervals, i.e. 2 grams every 3 minutes, to one liter of the aforementioned solution over a period of 15 minutes while continuously agitating said solution which was at a temperature of 31° C. After 12 minutes had elapsed from the initial addition of said mixture to said solution, approximately 2 grams of diatomaceous earth was also added to said solution as a filter aid for the solid or precipitated material formed therein. The solution was agitated for an additional 25 minutes after the final dosage was added thereto and then was filtered. The purified solution was analyzed and was found to contain 0.06 gram per liter lead and 0.01 gram per liter tin. This purification step of the cobalt-containing solution consequently resulted in a 94% removal of lead and a 99% removal of tin.

What is claimed is:

1. A process for treating a solution containing dissolved nonferrous metal values and tin and lead impurities to simultaneously remove the lead and tin impurities therefrom comprising the steps of contacting said solution with a mixture of calcium hydroxide and magnesium hydroxide, and removing the solid material formed in said solution therefrom, thereby also removing a substantial amount of said impurities.

2. The process of claim 1 wherein the contact time is from about 1 to about 60 minutes whereby during said time the rate of addition of said mixture to said solution is conducted at from about 1-minute intervals to about 5-minute intervals, and the weight ratio of said mixture to the total weight of lead plus tin impurities in the solution after all the additions have been made is from about 5:1 to about 10:1.

3. The process of removing lead and tin impurities from an alkaline solution containing another dissolved nonferrous metal value selected from the group consisting of copper, nickel, and cobalt which comprises the steps of: adding intermittently to said solution fractional amounts of a finely divided dead burnt dolomitic limestone containing a mixture of $Ca(OH)_2$ and $Mg(OH)_2$ thereby effecting the simultaneous precipitation of the lead and tin compounds from the solution, continuously agitating said solution during said addition and for a sufficient time thereafter to insure substantially complete precipitation of such compounds and separating the precipitated compounds from the solution.

4. A process according to claim 3 wherein the addition of said limestone is carried out over a total period of from about 15 to about 30 minutes and the intermittent addition is carried out at from about two-minute intervals to about four-minute intervals, the solution temperature is from about 30° C. to about 50° C., and the weight ratio, after all the intermittent additions have been made, of said limestone to the total concentration of lead plus tin is within the range of from about 5:1 to about 10:1.

5. A process according to claim 3 wherein a filter aid is added to said solution during the time of the addition of the limestone thereto and said solution is separated from the precipitated compounds by passing the solution through a filter.

6. The process according to claim 3 in which said finely divided dead burnt dolomitic limestone has a particle size range of from about 40 to about 150 microns.

7. In a hydrometallurgical process for producing copper, substantially free from lead and tin impurities, from copper-bearing material containing lead and tin wherein the copper-bearing material is leached with an ammoniacal ammonium carbonate solution to extract copper from said material and dissolve it in the leach solution along with lead and tin impurities, and the leach solution is separated from the undissolved residue; the improvement which comprises the steps of adding, over a total time of from about 15 minutes to about 30 minutes on an intermittent basis thereof, a uniform fractional amount to the ammonium carbonate solution, which is at a temperature of from about 20° C. to about 50° C., of a mixture of (1) from about 40 to about 70% by weight, based on the total weight of said mixture, of calcium hydroxide and (2) from about 60 to about 30% by weight, based on the total weight of said mixture, of magnesium hydroxide; agitating said solution during the addition of said mixture and for a sufficient time thereafter to insure substantially complete precipitation of the lead and tin values; adding a filter aid to said solution during the addition of the mixture thereto; and separating the resulting precipitated lead and tin compounds, which were produced by the addition of said mixture, along with the filter aid by filtration.

8. The process of claim 7 wherein the mixture has a particle size range of from about 40 to about 150 microns, the weight ratio, after all the intermittent additions have been made, of the said mixture to the total concentration by weigh of lead plus tin is within the range of from about 5:1 to about 10:1, and the intermittent rate of addition is conducted at from about 2-minute intervals to about 4-minute intervals.

9. The process of claim 7 wherein the filter aid is diatomaceous earth and the amount thereof added to said solution is within the range of from about 1 to about 3 grams per liter of said solution.

References Cited

UNITED STATES PATENTS

| | | | |
|---|---|---|---|
| 1,780,323 | 11/1930 | Waring | 75—120 |
| 2,142,274 | 1/1939 | Kuss | 75—120 |
| 2,350,918 | 6/1944 | Norlander et al. | 75—98 |
| 2,695,226 | 11/1954 | Lekedoff | 75—108 |
| 2,703,272 | 3/1955 | Fuchsman | 75—120 |
| 2,923,618 | 2/1960 | Redemann et al. | 75—108 |
| 2,970,051 | 1/1961 | Mackiw et al. | 75—120 |
| 3,127,264 | 3/1964 | Tschirnes et al. | 75—108 |

DAVID L. RECK, *Primary Examiner.*

N. F. MARKVA, *Assistant Examiner.*